United States Patent
Mitterreiter et al.

(10) Patent No.: US 10,612,945 B2
(45) Date of Patent: Apr. 7, 2020

(54) ANGLE MEASUREMENT SYSTEM

(71) Applicant: DR. JOHANNES HEIDENHAIN GmbH, Traunreut (DE)

(72) Inventors: Johann Mitterreiter, Chieming (DE); Sonja Niemeyer, St. Georgen (DE); Jürgen Hertenberger, Bodenkirchen/Aich (DE); Georg Kaffl, Brannenburg (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 178 days.

(21) Appl. No.: 15/939,062

(22) Filed: Mar. 28, 2018

(65) Prior Publication Data
US 2018/0283908 A1 Oct. 4, 2018

(30) Foreign Application Priority Data
Mar. 29, 2017 (EP) .................... 17163542

(51) Int. Cl.
*G01D 5/347* (2006.01)
*G01D 3/028* (2006.01)
(Continued)

(52) U.S. Cl.
CPC .......... *G01D 5/3473* (2013.01); *F16C 33/66* (2013.01); *G01D 3/028* (2013.01); *G01D 11/02* (2013.01);
(Continued)

(58) Field of Classification Search
CPC ................................. G01D 5/3473
(Continued)

(56) References Cited

U.S. PATENT DOCUMENTS 6,615,501 B2 * 9/2003 Skerka ............... G01C 19/38
33/324
7,398,699 B2 * 7/2008 Itomi ............... G01D 11/16
33/1 N
(Continued)

FOREIGN PATENT DOCUMENTS

EP 1447579 A1 8/2004
EP 2378251 A2 10/2011
(Continued)

*Primary Examiner* — George B Bennett
(74) *Attorney, Agent, or Firm* — Hunton Andrews Kurth LLP

(57) ABSTRACT

An angle measurement system includes a first component group, a second component group, and bearing elements arranged between the component groups. A gap extends at an axial extension between a first component and a second component so that the components are disposed along both sides of the gap relative to each other without coming into contact. An annular first body is mounted on the first component, which is disposed without contact in relation to the second component group. The second component includes a section, which is separated by a radial gap and is located radially outside and across from a region of the first body that extends in the axial direction, and the first body is situated radially outside and circumferentially about the axis in relation to the bearing elements. The first body is able to hold lubricant. Alternatively or additionally, a corresponding annular second body is fixed in place on the second component.

10 Claims, 2 Drawing Sheets

(51) Int. Cl.
  *H02K 11/21* (2016.01)
  *F16C 33/66* (2006.01)
  *G01D 11/02* (2006.01)
  *G01D 11/24* (2006.01)

(52) U.S. Cl.
  CPC .......... *G01D 11/245* (2013.01); *H02K 11/21* (2016.01); *F16N 2210/14* (2013.01)

(58) Field of Classification Search
  USPC ................................................ 33/1 PT, 707
  See application file for complete search history.

(56) References Cited

U.S. PATENT DOCUMENTS

| | | | |
|---|---|---|---|
| 2002/0148123 A1* | 10/2002 | Mitterreiter | H02K 11/21 33/1 PT |
| 2005/0031239 A1 | 2/2005 | Aoki et al. | |
| 2008/0044119 A1 | 2/2008 | Aoki et al. | |
| 2011/0012591 A1* | 1/2011 | Mitterreiter | G01D 5/14 324/207.2 |
| 2011/0167659 A1* | 7/2011 | Maric | G01D 11/245 33/707 |
| 2011/0254542 A1 | 10/2011 | Meyer | |
| 2012/0188534 A1* | 7/2012 | Mitterreiter | G01D 5/145 356/138 |
| 2013/0301059 A1* | 11/2013 | Mayer | G01D 11/245 356/614 |
| 2014/0082954 A1* | 3/2014 | Chen | G01C 9/20 33/366.19 |
| 2014/0338204 A1* | 11/2014 | Meyer | F16C 33/745 33/1 PT |
| 2018/0159405 A1* | 6/2018 | Strasser | H02K 11/21 |
| 2019/0250012 A1* | 8/2019 | Thaler | F16C 32/0444 |

FOREIGN PATENT DOCUMENTS

| | | |
|---|---|---|
| JP | 2001/289668 A | 10/2001 |
| WO | WO 2010/031608 A2 | 3/2010 |

* cited by examiner

ANGLE MEASUREMENT SYSTEM

CROSS-REFERENCE TO RELATED APPLICATIONS

The present application claims priority to Application No. 17163542.8, filed in the European Patent Office on Mar. 29, 2017, which is expressly incorporated herein in its entirety by reference thereto.

FIELD OF THE INVENTION

The present invention relates to an angle measurement system.

BACKGROUND INFORMATION

Angle measurement systems, or angle encoder systems, are used for measuring rotary motions of a shaft across one or several rotation(s). The rotary motion is acquired either in an incremental or an absolute manner, and depending thereon, the output measured value is a sequence of counting pulses, a counter value or a code word. Angle encoder systems are used in particular in machine tools or processing centers for the measurement of rotatory motions. For example, the determination of the angle of rotation to a degree of just a few seconds of an angle is of decisive importance for rotary tables or swivel heads of machine tools, C-axes of lathes, and also for printing mechanisms of printing machines. Since extremely precise measuring results are able to be achieved when using optical measuring principles, such angle encoder systems are frequently equipped with an optical measuring system. In this case, an angle scale is often scanned using a reflected light or a transmitted light method.

In order to ensure a high measuring accuracy, it is important to protect the angle scale from contamination. It may be particularly disadvantageous if lubricant or components of such a lubricant leak(s) from the roller bearing and deposit(s) on the scanning device of the angle scale or in the region of the angle scale itself. Such contamination often takes the form of droplets and produces an optical effect similar to a lens. The light beams are deflected accordingly under these circumstances, which may lead to a faulty measurement.

European Published Patent Application No. 2 378 251 describes an angle encoder system, which has a shaft including a groove, which is connected to a hollow space for the storage of lubricants.

SUMMARY

Example embodiments of the present invention provide an angle measurement system that makes it possible to reliably achieve a high measuring accuracy.

According to an example embodiment of the present invention, an angle measurement system includes a first component group and a second component group; disposed between the component groups are rolling bodies so that the first component group is mounted in a rotatable manner about an axis in relation to the second component group. The first component group has a first component and an angle scale, while the second component group has a second component and a scanning device. With the aid of the scanning device, it is possible to generate a position signal that is a function of the position of the angle scale (relative to the second component group), and thus contains information about the angular position. A gap having an axial extension is situated between the first component and the second component so that the components are situated along both sides of the gap without coming into contact with one another. An annular first body, which is disposed in a contact-free manner with respect to the second component group, is mounted on the first component. The second component includes a section that is separated by a radial gap and is located radially outside and across from a region of the first body extending in the axial direction. The first body is disposed circumferentially around the axis and is located radially outside with respect to the rolling elements. The first body is furthermore arranged such that it is able to hold lubricant. Alternatively or additionally, an annular second body is mounted on the second component, which is disposed without contact in relation to the first component group. The first component includes a section that is separated by a radial gap and is located radially outside and across from a region of the second body extending in the axial direction. The second body is disposed radially outside and circumferentially about the axis in relation to the rolling elements and is able to hold lubricant.

The first component and/or the second component may include a respective component that has a circumferential end face, in particular a sectional circular area or a sectional annular area. In terms of geometry, a component may therefore have a substantially cylindrical, and particularly hollow-cylindrical, geometry. The circumferential end face of each of the components is particularly oriented at a right angle to the axis. The two end faces are thus situated in parallel planes that have an orthogonal orientation with respect to the axis or whose normal vectors are oriented parallel to the axis.

In particular, the angle scale is disposed radially outside relative to the gap. The radially extending gap between the components, which are disposed at an offset in the axial direction, is therefore situated closer to the axis than the angle scale, and, in particular, the end of the gap located radially on the inside may be used as a reference point for the relative spatial arrangement.

The first and/or the second body may have an annular configuration, and, in particular, may be disposed concentrically in the event that the angle encoder system has both a first and a second body, the center point or the center of mass of the two annular bodies being located on the axis, for example.

The first and/or the second body may include pores for holding the lubricant. In particular, the first and/or the second body may be arranged in mixed porous form so that the respective body includes both sealed cavities and cavities that are connected to one another and to the environment. The first and/or the second body may be produced from a material that includes a polyurethane plastic. In particular, the first and/or the second body may be produced from a foam material, e.g., a polyurethane material. The first and/or the second body may have a weight by volume of between 150 kg/m$^3$ and 300 kg/m$^3$, e.g., between 180 kg/m$^3$ and 280 kg/m$^3$.

With a view towards avoiding contamination of the scanning device and/or the angle scale, the first or the second body that is able to hold lubricant may be arranged so as to be free of fibers or lint.

The first body may be disposed on the first component in axially projecting form and dimensioned such that it covers the gap across and beyond its axial extension, e.g., covers it beyond the axial extension of the gap. Alternatively or additionally, the second body may be disposed on the second component in axially projecting form and be dimensioned such that it covers the gap across and beyond its axial extension. In particular, the first body and/or the second body penetrate(s) a geometrical plane that is situated in the region of the gap between the two end faces of the first and the second component at a right angle to the axis.

The first body may be fixed in place on the first component (e.g., in a circumferential first groove) and may dip into a circumferential second groove in the second component without establishing contact. Alternatively or additionally, the second body may be fixed in place on the second component, in particular in a circumferential first groove, and dip into a circumferential second groove in the first component without establishing contact.

The second annular body may be arranged radially outside with respect to the first annular body, the two annular bodies, for example, being disposed concentrically.

The scanning device may include a light source and a photodetector, and the angle scale may be arranged to modulate the light emitted by the light source as a function of the relative angular position between the first component group and the second component group, and the photodetector may be arranged to convert the light into photocurrents.

The angle measurement system can be used for measuring a rotary motion, e.g., for determining an existing rotary position or a rate of rotation.

Further features and aspects of example embodiments of the present invention are described in more detail below with reference to the appended Figures.

DETAILED DESCRIPTION

Figure 1:
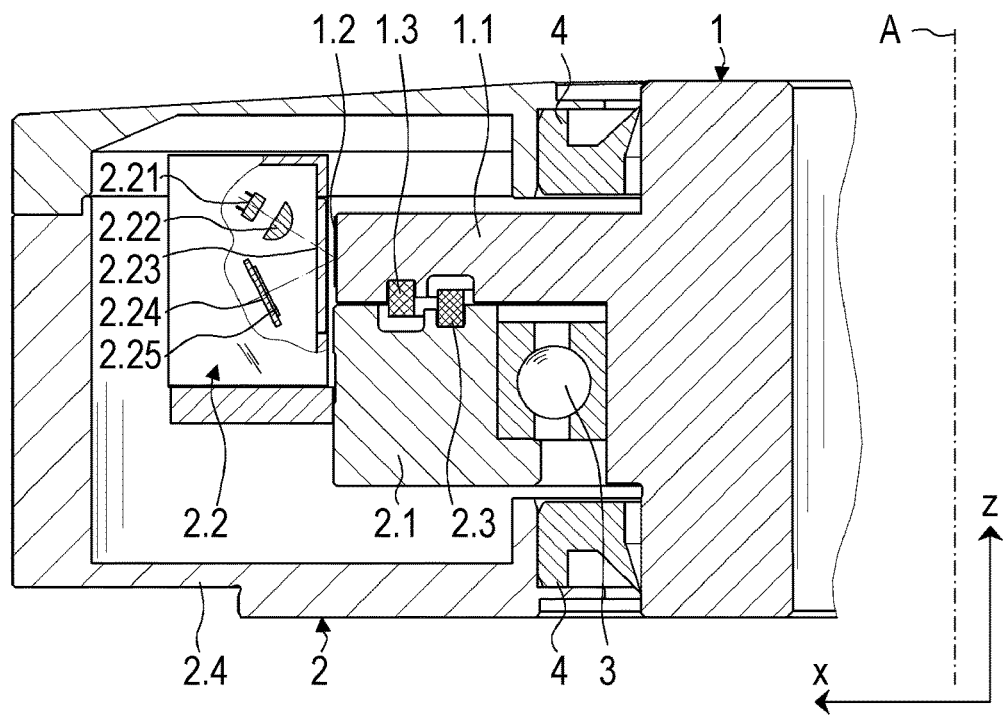
FIG. 1 is a cross-sectional view of an angle measurement system according to an example embodiment of the present invention.

FIG. 1 is a cross-sectional view of an angle measurement system. It includes a first component group 1, which serves as a rotor in the illustrated exemplary embodiment and is rotatable about an axis A in relation to a second component group 2, axis A extending in the z-direction according to the Figures. Second component group 2 may also be referred to as a stator. First component group 1 is rotatable in relation to second component group 2 with the aid of a roller bearing that includes rolling elements 3.

First component group 1 has a first component 1.1 on which an angle scale 1.2 is centrically positioned with respect to axis A. In the exemplary embodiment illustrated in FIG. 1, angle scale 1.2 has a special, optically acting configuration that uses reflecting gold layers, in particular, and angle scale 1.2 is disposed on first component 1.1 on the jacket side.

Figure 2:
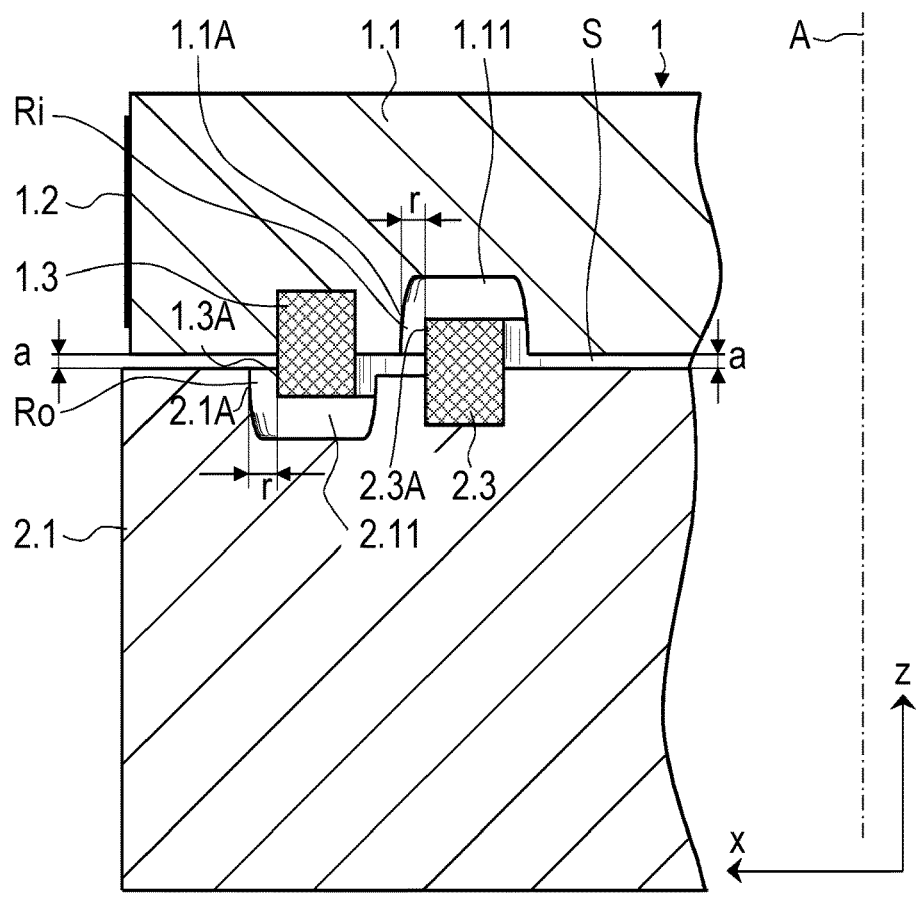
FIG. 2 is an enlarged cross-sectional view of the angle measurement system.

Second component group 2 has a second component 2.1, which is connected to a stationary housing 2.4. In addition, second component group 2 includes a scanning device 2.2. In the exemplary embodiment illustrated in FIG. 1, scanning device 2.2 has a light source 2.21, which may be arranged as an LED, for example, as well as a lens 2.22. Moreover, scanning device 2.2 includes a scanning plate 2.23, which has an optical graticule and a circuit board 2.24 on which photodetectors 2.25 are mounted. A gap S (see, e.g., FIG. 2) having an axial extension a, i.e., an extension a in the z-direction, extends between first component 1.1 and second component 2.1. In the exemplary embodiment illustrated in FIG. 1, extension a amounts to approximately ¼ mm. Components 1.1, 2.1 are therefore situated along both sides of gap S relative to one another without coming into contact with each other. In addition, angle scale 1.2 is situated radially outside relative to gap S, i.e., at an offset in an x-direction, the x-direction having an orthogonal orientation to the z-direction. In particular, angle scale 1.2 is disposed at the radially outer end of gap S. In other words, the angle encoder system is configured such that angle scale 1.2 has a greater distance from axis A than the region in which gap S extends.

First component 1.1 has a circumferential groove in which an annular first body 1.3 is fixed in place, in particular glued. Second component 2.1 has a circumferential second groove 2.11, and first body 1.3 axially dips into second groove 2.11 or into second component 2.1 without establishing contact. Accordingly, second component 2.1, in particular second groove 2.11, has a section 2.1A, which, set apart by a radial gap Ro (see, e.g., FIG. 2), is located radially outside and across from a region 1.3A of first body 1.3 extending in the axial direction. Annular first body 1.3 is made, for example, from a mixed porous polyurethane plastic.

In addition, second component 2.1, too, includes a circumferential groove in which an annular second body 2.3 is fixed in place, in particular also glued. First component 1.1 has a circumferential first groove 1.11, and second body 2.3 axially dips into first groove 1.11 or into first component 1.1 without making contact. As a result, first component 1.1 also has a section 1.1A that is situated, separated by a radial gap Ri (see, e.g., FIG. 3), across from and radially outside a region 2.3A of second body 2.3 that extends in the axial direction.

First body 1.3 is therefore disposed on first component 1.1 in an axially projecting manner and dimensioned such that first body 1.3 covers gap S across and beyond the axial extension a of gap S. Second body 2.3 is likewise disposed in an axially projecting manner on second component 2.1 and dimensioned such that it covers gap S across and beyond its axial extension a. In the final result, a labyrinth-type structure is produced in this manner.

The circumferential groove in first component 1.1, the groove in second component 2.1, first groove 1.11, and second groove 2.11 extend along circular lines having different radii, the circular lines being arranged concentrically and having their respective center point on axis A.

The annular second body 2.3 is also produced from a mixed porous polyurethane plastic, similar to the annular first body 1.3.

Gap dimensions r of radial gap Ro, Ri are of equal size in the exemplary embodiment illustrated in FIG. 1, r having a value of 0.5 mm, for example, and being greater than axial extension a of axial gap S.

The angle measurement system is intended for the attachment to a machine, the first component group 1 being arranged for a torsionally fixed connection to a component to be measured, such as on an engine shaft. The angle measurement system therefore makes it possible to ascertain the relative angular position between the stator and the rotor or between first component group 1 and second component group 2.

Seals 4 are disposed between first component group 1 and second component group 2 in order to protect the interior of housing 2.4, in particular angle scale 1.2, from outside contamination.

During the operation of the angle measurement system, the light emitted by light source 2.21 is collimated and reflected by angle scale 1.2 after passing through scanning plate 2.23, and the light is modulated according to the angular position between first component group 1 and second component group 2. The modulated light finally impinges upon photodetectors 2.25 and is thereby converted into electrical signals. Among others, scanning device 2.2 also includes electronic components for the signal generation, e.g., for amplifying and digitizing the scanning signals supplied by photodetectors 2.25. An electrical connection is established between the angle measurement system and subsequent electronics via a connection cable so that electrical signals and electrical energy are able to be transmitted between the subsequent electronics and the angle measurement system. This allows scanning device 2.2 to generate a position signal that is a function of the position of angle scale 1.2.

When the angle measurement system is in operation, first component group 1, and thus also first component 1.1, is able to rotate at a considerable rotational frequency. A fault-free operation of the angle measurement system requires rolling elements 3 of the bearing to be lubricated, which is the reason for the supply of lubricant or lubricating grease. The rotary motion creates a virtual suction effect that moves the lubricant components of the lubricating grease, e.g., in the form of an oily liquid, radially through gap S and towards the outside. In addition, the lubricant components are subject to centrifugal forces. As a result, the lubricant components in gap S move outward and then encounter second body 2.3, which has pores for holding the lubricant or its components. The holding capacity of second body 2.3 for lubricant or its components is dimensioned such that, on its own, it is already able to hold the entire expected lubricant quantity. For a further increase in safety, e.g., for reliably preventing lubricant from making its way to angle scale 1.2, first body 1.3 is provided, which is also able to hold lubricant.

Figure 3:
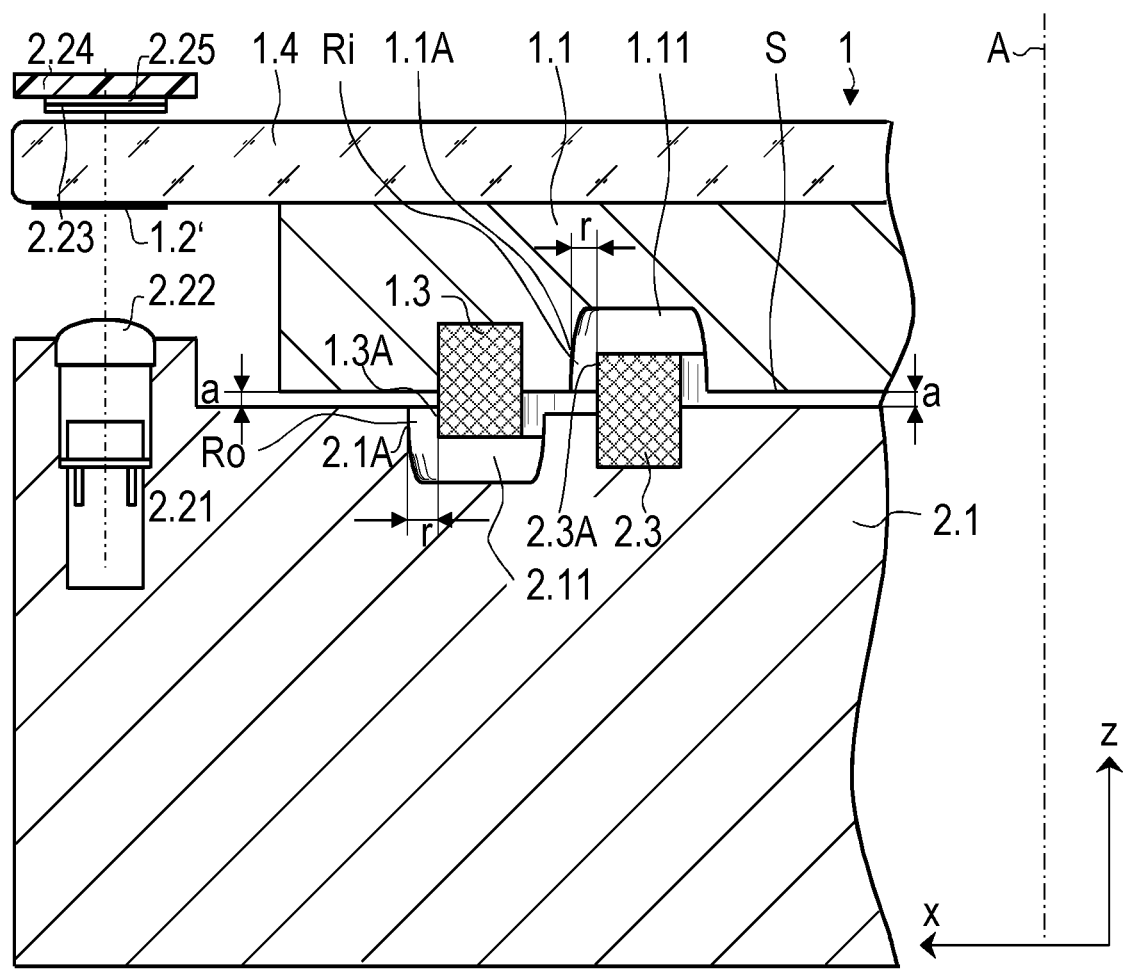
FIG. 3 is an enlarged cross-sectional view of an angle measurement system according to an example embodiment of the present invention.

A further exemplary embodiment is explained with reference to FIG. 3. The angle encoder system illustrated in FIG. 3 differs from the exemplary embodiment described above in that a transparent disk 1.4 is fixed in place on first component 1.1 in a torsionally fixed manner. Disk 1.4 is made from glass and has an annular shape. It includes two end faces, one of which carries an angle scale 1.2'. For example, angle scale 1.2' may be arranged as an incremental scale division having radially oriented scale lines, but an absolute code may also be provided additionally or alternatively. The end faces are located in a plane that is oriented with an orthogonal directional component in relation to the z-direction. In particular, the end faces are arranged in a plane that is intersected by axis A at a right angle.

While the angle measurement system is in operation, the light emitted by light source 2.21 is collimated by lens 2.22. The light then passes through angle scale 1.2' and disk 1.4 and also through scanning plate 2.23. In doing so, the light is modulated according to the angular position between first component group 1 and second component group 2. The modulated light finally impinges upon photodetectors 2.25, which are mounted on a circuit board 2.24 and which convert the light into electrical signals. In this exemplary embodiment, too, the signals are amplified and transformed by electronic components. Light source 2.21, lens 2.22, scanning plate 2.23, and circuit board 2.24 including photodetectors 2.25 are allocated to the second component group so that angle scale 1.2' is rotatable relative to these components.

Because of the particular arrangement of the angle measurement system, it is possible to keep residual lubricant such as oil droplets that separate out from the lubricant away from angle scale 1.2, 1.2'. Such residual lubricant frequently leads to faulty measurements because it is able to affect the beam path of the light emitted by light source 2.21. Shielding from residual lubricant is ensured even during an operation at high rotational frequencies. On the other hand, the particular construction, in particular the contact-free configuration, ensures that no reduction in the measuring accuracy occurs as a result of the measures aimed at keeping residual lubricant away from angle scale 1.2, 1.2'.

What is claimed is:

1. An angle measurement system, comprising:
    a first component group including a first component and an angle scale;
    a second component group including a second component and a scanning device, the scanning device adapted to generate a position signal as a function of position of the angle scale; and
    bearing elements arranged between the first component group and the second component group, the first component group rotatably mounted about an axis relative to the second component;
    wherein a gap extending in an axial direction is provided between the first component and the second component, the components arranged on both sides of the gap relative to each other without coming into contact; and
    wherein:
        (a) an annular first body is fixed in place on the first component and arranged without contact relative to the second component group, the second component including a section that is separated by a first radial gap and is located radially outside and across from a region of the first body extending in the axial direction, and the first body is arranged radially outside and circumferentially about the axis in relation to the bearing elements, and the first body is adapted to hold lubricant; and/or
        (b) an annular second body is fixed in place on the second component and arranged without contact relative to the first component group, the first component including a section that is separated by a second radial gap and is located radially outside and across from a region of the second body extending in the axial direction, the second body being disposed radially outside and circumferentially around the axis in relation to the bearing elements, and the second body is able to hold lubricant.

2. The angle measurement system according to claim 1, wherein the first body and/or the second body includes pores adapted to hold the lubricant.

3. The angle measurement system according to claim 2, wherein the first body and/or the second body has a mixed porous configuration, including both open cell and closed cell structures.

4. The angle measurement system according to claim 1, wherein the first body and/or the second body is formed of a material that includes a polyurethane plastic.

5. The angle measurement system according to claim 1, wherein:

(a) the first body is arranged on the first component in an axially projecting manner and is dimensioned to cover the gap across and beyond the axial extension of the gap; and/or
(b) the second body is arranged on the second component in an axially projecting manner and is dimensioned to cover the gap across and beyond the axial extension of the gap.

6. The angle measurement system according to claim 1, wherein:
(a) the first body is fixed in place on the first component and extends into a circumferential second groove in the second component without coming into contact with the second component; and/or
(b) the second body is fixed in place on the second component and extends into a circumferential second groove in the first component without coming into contact with the first component.

7. The angle measurement system according to claim 1, wherein:
(a) the first body is fixed in place on the first component in a circumferential first groove and extends into a circumferential second groove in the second component without coming into contact with the second component; and/or
(b) the second body is fixed in place on the second component in a circumferential first groove and extends into a circumferential second groove in the first component without coming into contact with the first component.

8. The angle measurement system according to claim 1, wherein an annular first body is fixed in place on the first component, and an annular second body is fixed in place on the second component, the second annular body being concentrically disposed with respect to the first annular body.

9. The angle measurement system according to claim 1, wherein an annular first body is fixed in place on the first component, and an annular second body is fixed in place on the second component, the second annular body being arranged radially outside relative to the first annular body.

10. The angle measurement system according to claim 1, wherein the scanning device includes a light source and a photodetector, the angle scale adapted to modulate light emitted by the light source as a function of relative angular position, the photodetector adapted to convert the modulated light to a photocurrent.

* * * * *